United States Patent
Liu et al.

(10) Patent No.: US 11,516,432 B2
(45) Date of Patent: Nov. 29, 2022

(54) MODE CONTROL AND CONTENT SHARING

(71) Applicant: DTEN, Inc., San Jose, CA (US)

(72) Inventors: Wei Liu, San Jose, CA (US); Jin Guo, San Jose, CA (US); Sally Tung, San Jose, CA (US)

(73) Assignee: DTEN, Inc., San Jose, CA (US)

( * ) Notice: Subject to any disclaimer, the term of this patent is extended or adjusted under 35 U.S.C. 154(b) by 0 days.

(21) Appl. No.: 17/399,299

(22) Filed: Aug. 11, 2021

(65) Prior Publication Data

US 2022/0053166 A1 Feb. 17, 2022

Related U.S. Application Data

(60) Provisional application No. 63/064,496, filed on Aug. 12, 2020.

(51) Int. Cl.
*H04N 7/15* (2006.01)
*G06F 3/0482* (2013.01)
*G06F 3/0488* (2022.01)

(52) U.S. Cl.
CPC ............. *H04N 7/15* (2013.01); *G06F 3/0482* (2013.01); *G06F 3/0488* (2013.01)

(58) Field of Classification Search
CPC .... H04N 7/147; H04N 7/15; H04N 21/42204; H04N 21/4222; G06F 3/0482; G06F 3/0488
USPC .......................................... 348/14.01–14.16
See application file for complete search history.

(56) References Cited

U.S. PATENT DOCUMENTS

| | | | |
|---|---|---|---|
| 9,804,731 B1* | 10/2017 | Baloga | ............... G06F 3/04847 |
| 10,798,339 B2 | 10/2020 | McMillan et al. | |
| 2010/0302346 A1* | 12/2010 | Huang | ..................... H04N 7/15 |
| | | | 709/204 |
| 2013/0002800 A1 | 1/2013 | Mock | |
| 2015/0326705 A1 | 11/2015 | Gamham et al. | |

(Continued)

FOREIGN PATENT DOCUMENTS

| | | | |
|---|---|---|---|
| GB | 2525902 A | 11/2015 | |
| WO | 2018227290 A1 | 12/2018 | |
| WO | WO-2019217477 A1 * | 11/2019 | ......... G06F 3/04817 |

OTHER PUBLICATIONS

Written Opinion issued in related Application No. PCT/US2021/045492 (11 pages).

*Primary Examiner* — Melur Ramakrishnaiah
(74) *Attorney, Agent, or Firm* — Lempia Summerfield Katz LLC

(57) ABSTRACT

A system controls a teleconferencing device by detecting a current operating state of the teleconferencing device and detecting a contact with a touch-screen device associated with a selection of an audio and a visual input, a selection of an option from a list of options that performs an action in the teleconferencing device, or a transferring of a virtual object between a plurality of devices. The system continuously senses a gesture across the touch-screen device by identifying a first contact with the touch-screen, a distance of a continuous contact with the touch screen, and a last contact with the touch-screen. The process executes a command associated with the selection of an audio and a visual input, the selection of an option from a list of options that performs an action in the teleconferencing device, or the transferring of a virtual object between a plurality of devices.

20 Claims, 8 Drawing Sheets

(56) References Cited

U.S. PATENT DOCUMENTS

2021/0090773 A1\* 3/2021 Amin-Shahidi ...... H02P 25/092
2021/0405865 A1\* 12/2021 Faulkner ................ H04N 7/147

\* cited by examiner

MODE CONTROL AND CONTENT SHARING

PRIORITY CLAIM

This application claims the benefit of priority from U.S. Provisional Application No. 63/064,496, filed Aug. 12, 2020, titled "Mode Control and Content Sharing", which is herein incorporated by reference.

BACKGROUND OF THE DISCLOSURE

Technical Field

This application relates to interfaces, and more particularly to recognizing gestures to control teleconferencing devices.

Related Art

In electronics, a remote control allows users to operate other devices from a distance. Remote controls are often small handheld objects that can adjust features such as channels and volume levels wirelessly. Many controls are the only access point for some functions.

Since telecommunication device design remote controls to access many functions, a remote control's failure or loss of power render those functions unusable. Some of the most advanced telecommunication devices enable only basic functions when the remote control is lost or unusable via physical buttons located on the front, side, or bottom of the devices.

DETAILED DESCRIPTION

Figure 1:
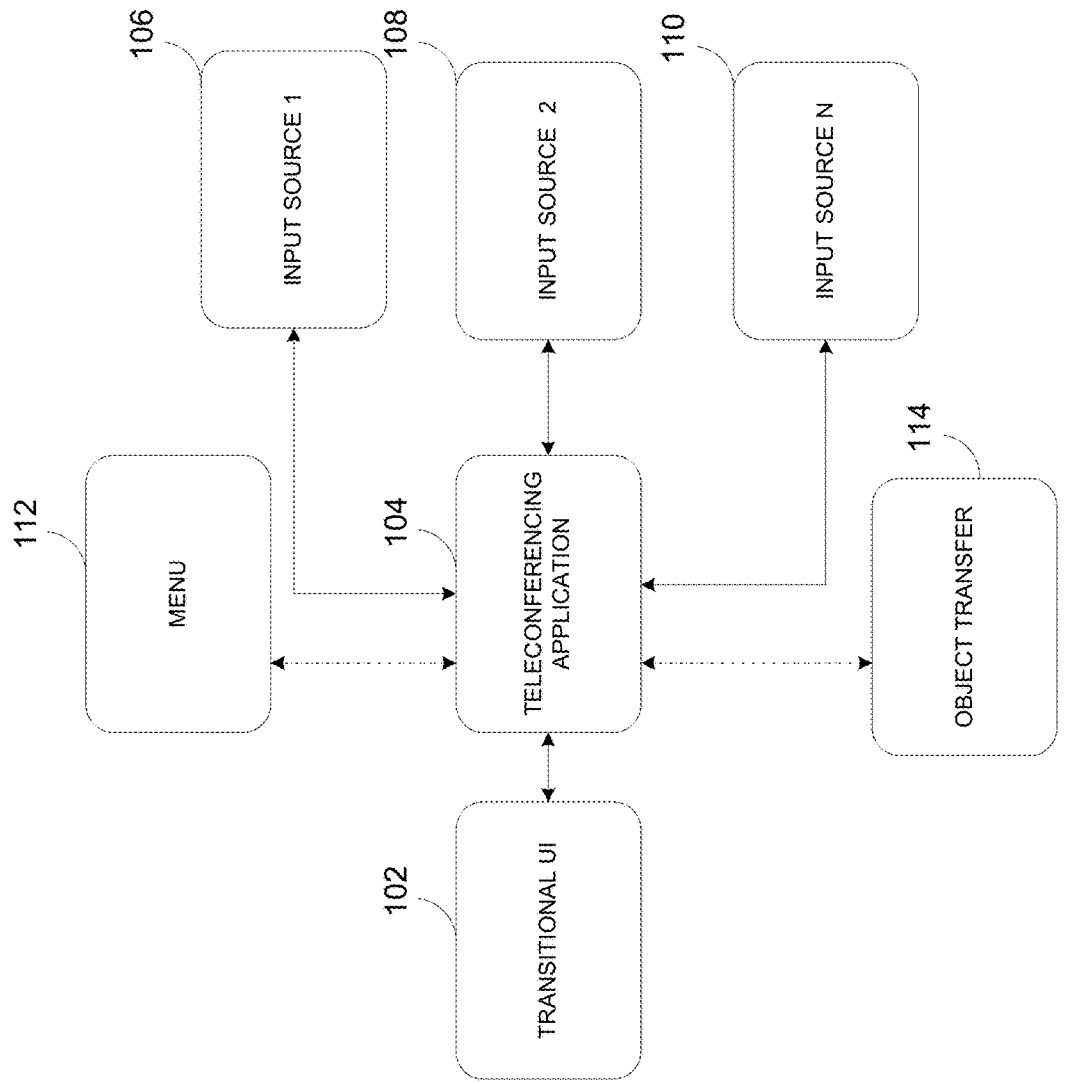
FIG. 1 is a block diagram of an electronic teleconferencing device or system (device and system referred to interchangeably in this disclosure).

A transitional user interface provides an intuitive stand-alone interaction node that controls system application programming interfaces (APIs) for tele-conferencing technology. The transitional user interface enables external automation to select audio/visual (A/V) inputs through physical and digital detections conveyed via a touchless gesture and/or a physical touch gesture. The systems allow users to control A/V inputs and/or transfer content through a more natural process, that in some systems, provide visual, aural, and/or tactile responses (e.g., confirmations) without requiring the user to step through the computational steps required to select an input mode or transfer or exchange content from one device (e.g., a local device) to one or more other devices (e.g., the remote device). There is no need for formal processes that select devices, menus, or inputs. All that is required is for the devices to recognize each other and enable a fluid intuitive user interaction.

To improve the selection of A/V inputs, menu selections, and send/receive virtual objects (e.g., a document, file, folder, icon, picture, etc.) or commands in a virtual teleconference system, all that is required is the simulation of or dragging of two or more fingers across a virtual screen or a tangible screen if interacting via a physical device instead of walking through a regimented sequence.

The disclosed systems push aside the user's need to learn computational processes described in user manuals that enable this functionality, by externalizing the programming through an intuitive transitional user interface and API that enables device-to-device communication. The devices and/or systems (referred to interchangeably) expose a secure interface that makes external connections in the background, materializes those connections on the devices' screens, and translates users' touchless gestures and/or contact gestures from one device into protocol specific commands understood and executed by another device (such as a remote device) or proprietary commands executed by the teleconferencing applications that enable the selection and switching of an A/V input, a menu option, and/or a transfer of virtual objects between devices. In some systems, the interface translations are based on the current operating state of the device during the user's session, such as when the user is accessing a virtual huddle room, a virtual meeting room, a zoom room, an A/V input selection, or accessing a menu, for example. A session refers to the time in which two or more devices (e.g., teleconferencing devices) maintain a communication connection. It includes the time in which a software program accepts information and processes that information.

In a swipe event on a touch-sensitive screen and/or a virtual screen (referred to as a touch-screen or touch screen), the swipe gesture is broken down into three events: when the user brings fingers into contact with the touch-screen (e.g., in some systems, three or more fingers), the distance of continuous contact that the user moves those fingers across the touch-screen in a right-to left or left-to-right horizontal direction or in an up-and-down or down-and-up vertical direction, and the location of where those fingers make a last contact or a final simulated contact with the touch-screen.

As the user dispatches contact with the touch screen, a controller issues commands and the teleconferencing system executes those commands based on the current operating state of the teleconferencing system. The current operating state may serve a teleconference room, an input selection, a top-level menu or an intermediate level menu, etc., for example. A user's movement and the direction of that movement, such as swipe in a right-to-left direction or in a left-to-right direction generates a command. The distance measure, whether it by in an X coordinate direction or on Y coordinate direction (in a coordinate system) may distinguish a substantially horizontal or a substantially vertical swipe and determine its direction. From there, the final location of the swipe gesture (e.g., where the fingers end up) may identify a targeted destination. For example, if the host device is serving a virtual teleconference room, the final location of the user's fingers in a swipe gesture may determine the selected A/V input or select an option served from a list of options via a menu as a result the direction of the swipe gesture. If the device is in an input-selection state, the direction a user moves the user's hand may determine what virtual teleconference room a user is sent to or activate a desired action or command relayed by a menu served by teleconferencing system. If the device is serving a menu (e.g., a list of options, which a user may select to perform a desired action, such as issuing a command) the swipe direction may result in an input selection or entry into a predetermined virtual teleconference room served by the teleconferencing system.

Figure 7:
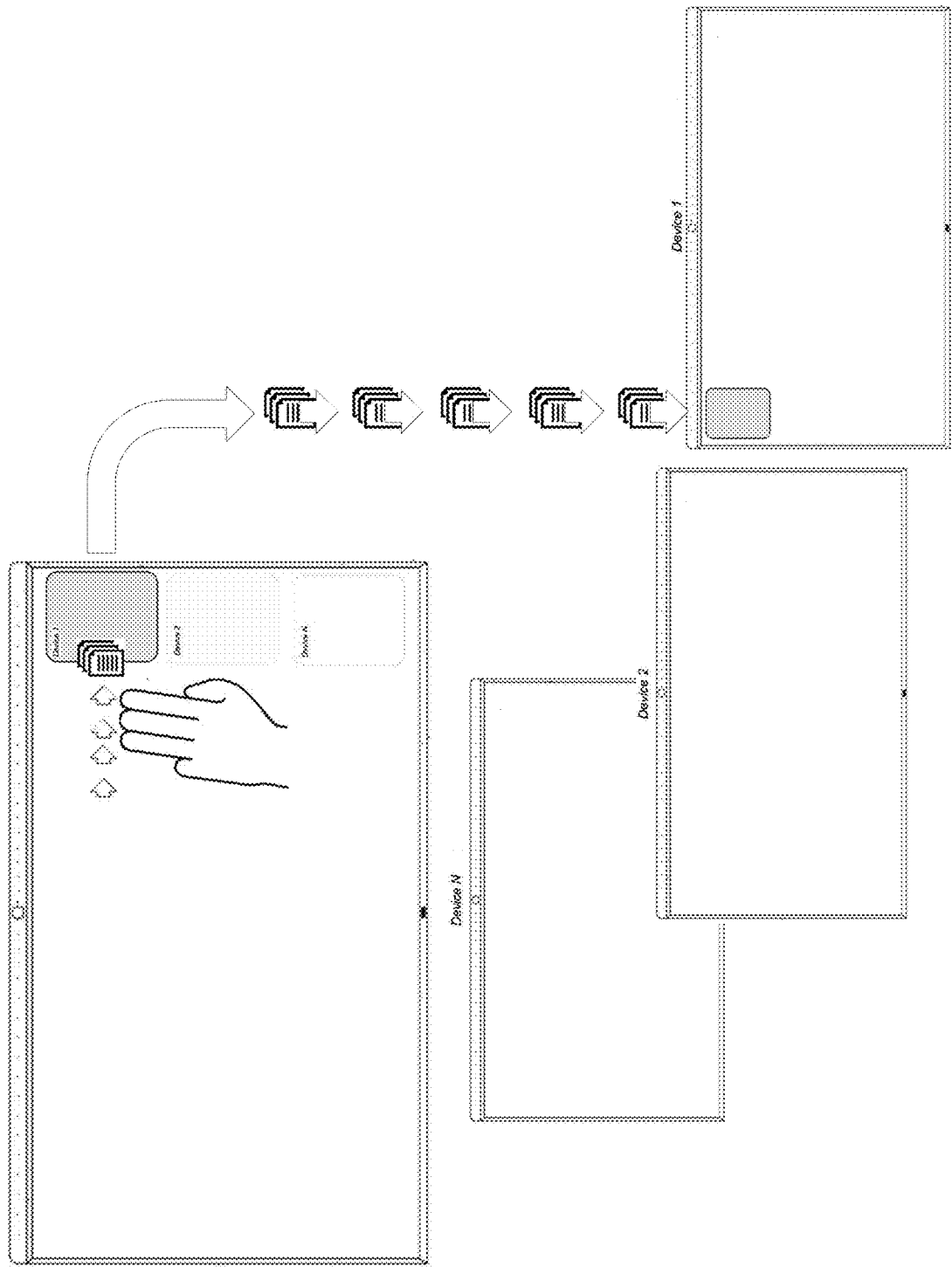
FIG. 7 shows a transferring a virtual object between a sending device and remote receiving devices.

Some transitional user interfaces, require the user's finger to move in a specific direction and not deviate substantially from a main direction of travel. While the direction, type of swipe (e.g., a movement up-or-down, left-or-right), and number of fingers required for the swipe gesture are configurable (requiring the use of two, three, or more fingers simultaneously, for example), exemplary systems use three fingers or more. The disclosed swipe gestures are discrete, so the transitional user interface action method can be called during or after the swipe gesture ends, despite being interpreted as three discrete events in some systems. As a result, some of the recognized swipe gestures care only about the events conveyed by the swipe gestures and not about precisely tracking the movement of the user's fingers on the touch-screen or across a virtual screen in alternate systems. In some systems, the destination determines where the selected content is transferred to. For example, the fingers' last contact on a touch screen or apparent touch on a virtual screen may materialize a landing spot rendered by the sending and receiving devices, such as the rectangular landing spot shown in FIG. 7 during the swiping gesture (between the first and last contact) that visualize the link that is formed by the devices exchanging (e.g., sending and/or receiving) virtual objects (referred to as objects) such as data, information, images, an/or files, for example. In some systems, the landing spots materialize drop boxes that are used to share virtual objects. In some systems, a landing spot or a virtual drop box associated with all of the receiving devices allows a sending device to transmit objects simultaneously and in real time (e.g., transmitting objects at the same or faster rate than the detection occurs, with no delay) to all of the devices, in addition to serving audio and video to all of the remote users at different locations. The objects may be simultaneously served and automatically stored in the memory of each of the remote user devices or cloud-based storage device accessible to each of the receiving devices without rendering the content on screen or require the remote user's authorization or access.

The disclosed functionality does not require extended contact or exaggerated physical or touchless gestures, as the swipe gestures are interpreted by a controller. The discrete interactions are interpreted as events that are captured whether the gestures are rendered by a quick flick of the user's risk, an extended contact and/or prolonged apparent contact, that in some applications, serve interactive transitions that materialize a menu on the teleconferencing system's screens and enable a selection from a list of options conveyed by a top-down menu. For an A/V input selection, the systems materialize an input mode menu on the teleconferencing device that enable a user's input selection which materializes a visual and actual communication link between separate hardware devices. The process visualizes how the devices are connected on the device's screens that then fades from view when or as the A/V switching occurs. For an object transfer, some alternate systems enable the transfer of content, images and/or files, for example, to an endpoint destination that materialize a virtual drop box on the teleconference devices. A user's swipe materializes a representation of the actual link that is created between the hardware devices because of the gesture. The drop box visualizes how the devices are connected and visualizes the transmission and reception of the objects that thereafter dissolves by sequentially lowering the opacity of the visualization.

FIG. 1 is a block diagram of a portable/stationary electronic teleconference system that automates a controller that manages the transitional user interface 102. The transitional user interface 102 connects users to teleconferencing applications 104 through a touch-screen that controls the selections of A/V inputs 106-110, option selections via a menu controller 112, or sends and/or receives objects across devices via an object transfer controller 114. Using common or different communication protocols, the transitional user interface 112 communicates with the teleconference application 104 via a network and captures swipe-events. The transitional user interface 102 converts captured gestures into commands and/or desired actions that are executed to help control other devices connected to the teleconferencing application 104 or devices that are part of the teleconferencing application 104. Based on the operating state of the teleconferencing application 104, the transitional user interface transfers those commands with other information, to the teleconferencing application 104. In FIG. 1, the transitional user interface is a stand-alone process that provides secure access to local and remote endpoint devices.

Figure 2:
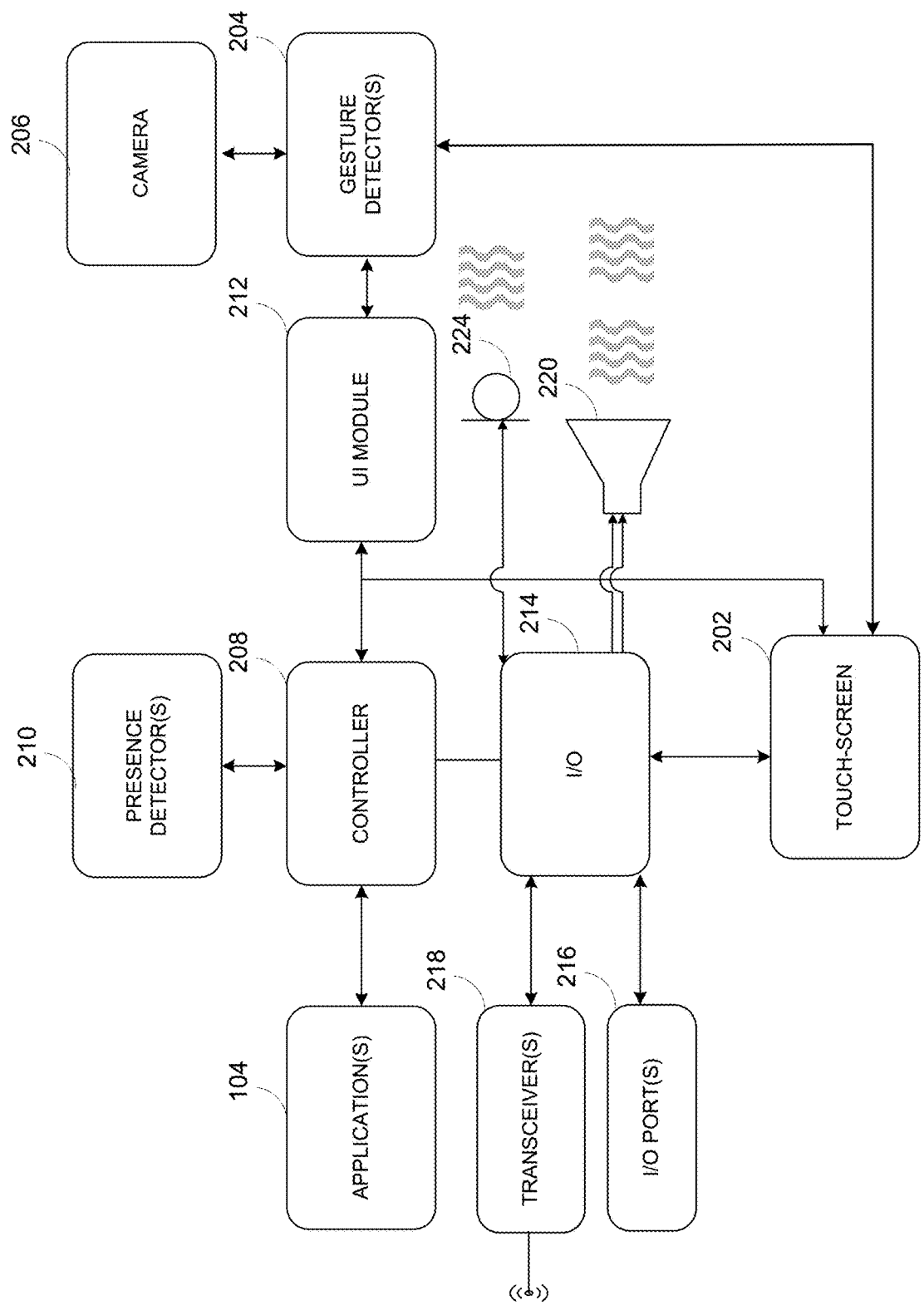
FIG. 2 is a second block diagram of an electronic teleconferencing system.

FIG. 2 is a block diagram of a portable/stationary electronic teleconferencing device (also referred to as a teleconferencing system). The device includes a user interface module 212 that exposes the transitional user interface 102 through a touch-screen 202 and a gesture detector 204 that captures the user's physical gestures and one or more cameras 206, a controller 208, and the gesture detector 204, that captures touch-less gestures in alternative devices. As shown, an optional proximity or optical sensor 210 detects the user's presence, and in some software applications, measures or estimates distance of one or more users (e.g., the target(s)) in a configurable virtual gesture detection area without physical contact with the sensor. A passive infrared and/or motion sensor that is unitary part of the one or more cameras 206 in some systems, and a standalone camera in others as shown in FIG. 2 for example, detects the presence of one or more users, when motion is detected such as when a swipe gesture occurs. The systems transition from a stand-by-state to an interactive state (e.g., an active state) when the user is detected.

The transitional user interface 102 connects to the teleconferencing applications 104 through the controller 208 shown in FIG. 2. The controller 208 provides and controls access to circuitry that inputs and outputs data and commands through an I/O subsystem 214. The I/O subsystem 214 serves as an interface between input/output peripherals that communicate to the telecommunication device, such as through the touch-screen 202 and other input/control devices. The I/O subsystem 214 includes a touch-screen controller (not shown) and one or more and I/O ports 216 that serve other devices. In FIG. 2, the controller 208 provides access to the transceivers 218 that transmit and receive data via a single device, and audio circuitry that includes one or more audio speakers 220 and one or more microphones 224 that serve as an audio interface between the local and remote users via the teleconferencing applications 104.

Figure 3:
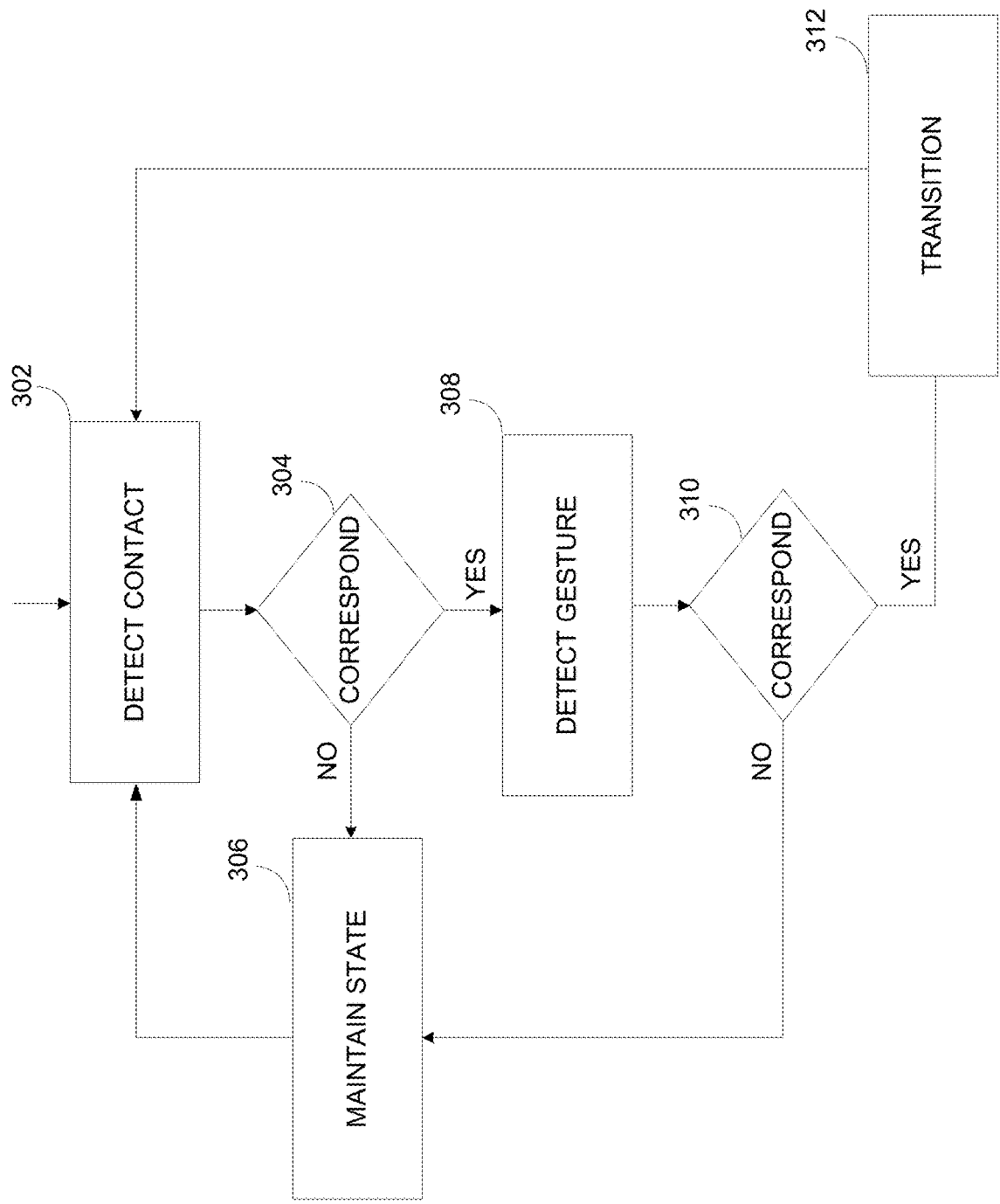
FIG. 3 is a process that transitions a device to a different operating state based on the device's current operating state.

In FIG. 3, the touch-screen detects a user's input based on a physical contact at 302 or virtual contact in alternate systems. The touch-screen 202 detects physical contact and any movement or break in the physical contact on the touch-screen 202 when it occurs for a predetermined period of time and/or comprises a predetermined number of touches at 304. If contact is not recognized, the device does not change states at 306. Gesture recognition begins when a predetermined amount of movement (e.g., distance) is detected. When multiple fingers are used, the gesture detector 204 uses the center/central point, substantial center/central point, or center/central axis of the set of touches as the touches move across the touch-screen 202 to measure the distance from the gestures originating location (e.g., the process save the original position of the physical/virtual touch in a memory) in a relative X and Y coordinate space. A center/central axis comprises a virtual straight line about which the touch moves through, such that there is a substantially equal distance areas between the outer ends of the contact or outer fingers (e.g., distal fingers to the central axis) generating the touch. A center/central point is a point on the central axis. When the user's fingers lift from the touch-screen, the detection state ends, the final position is saved in memory, and the distance and direction are generated at 308. In some systems, direction is determined by calculating a difference between the original position and final position of the touch with the sign (e.g., positive or negative) of the difference indicating the direction. A positive value along the X-coordinate indicating a left-to-right movement. A positive value along the Y-coordinate indicating a down-to-up direction. A negative value along the X-coordinate indicating a right-to-left movement. A negative value along the Y-coordinate indicating a top-to-down movement. If most of the difference between positions occurs in the X-coordinate space, a horizontal or substantially horizontal swipe is identified (e.g., a left-to-right or right-to-left swipe). If most of the difference between touch positions occurs in the Y-coordinate space, a vertical or substantially vertical swipe is detected (e.g., an up-to-down or a down-to-up swipe).

Figure 4:
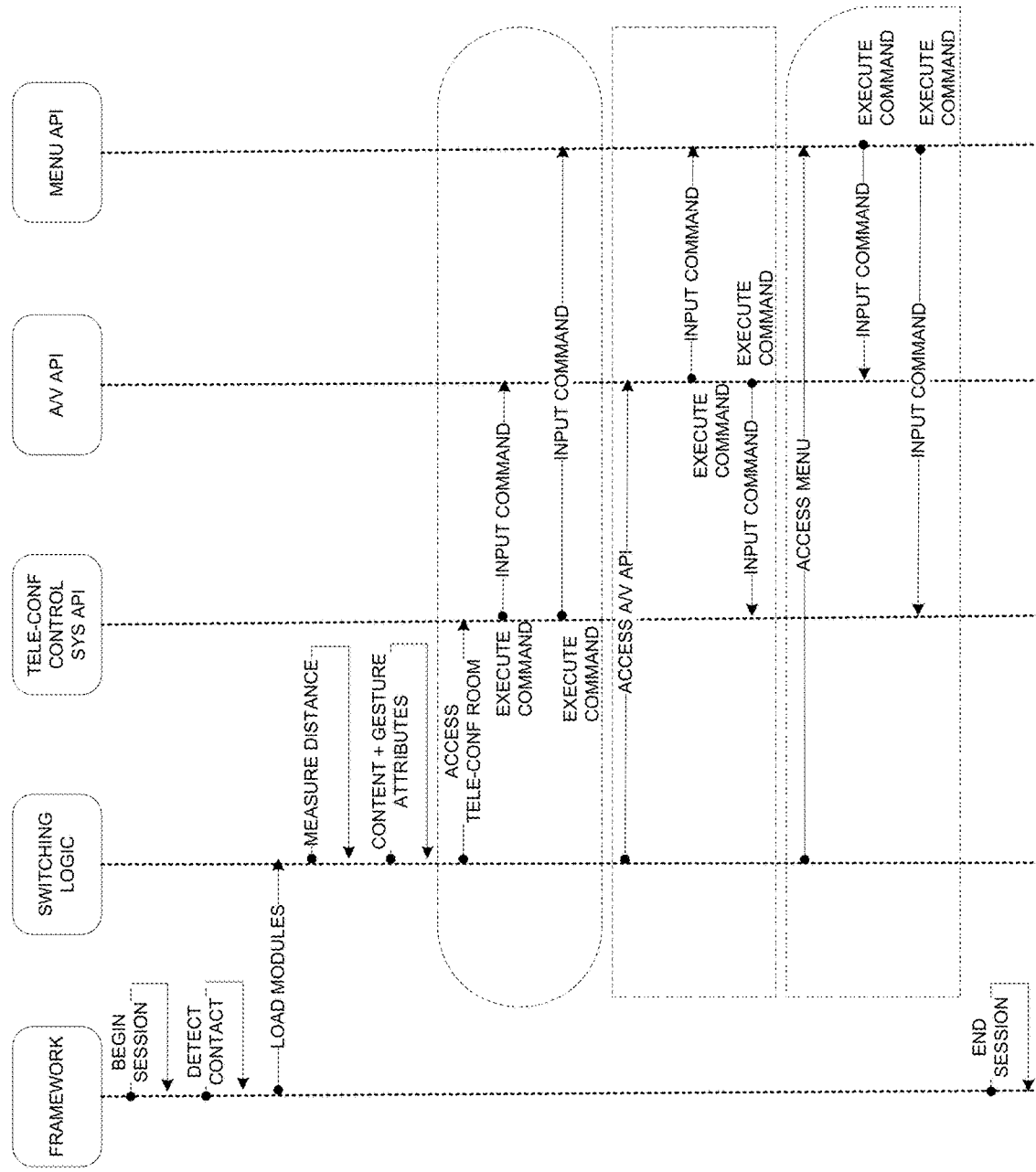
FIG. 4 is a second process that transitions a device to a different operating state based on the device's current operating state.
Figure 5:
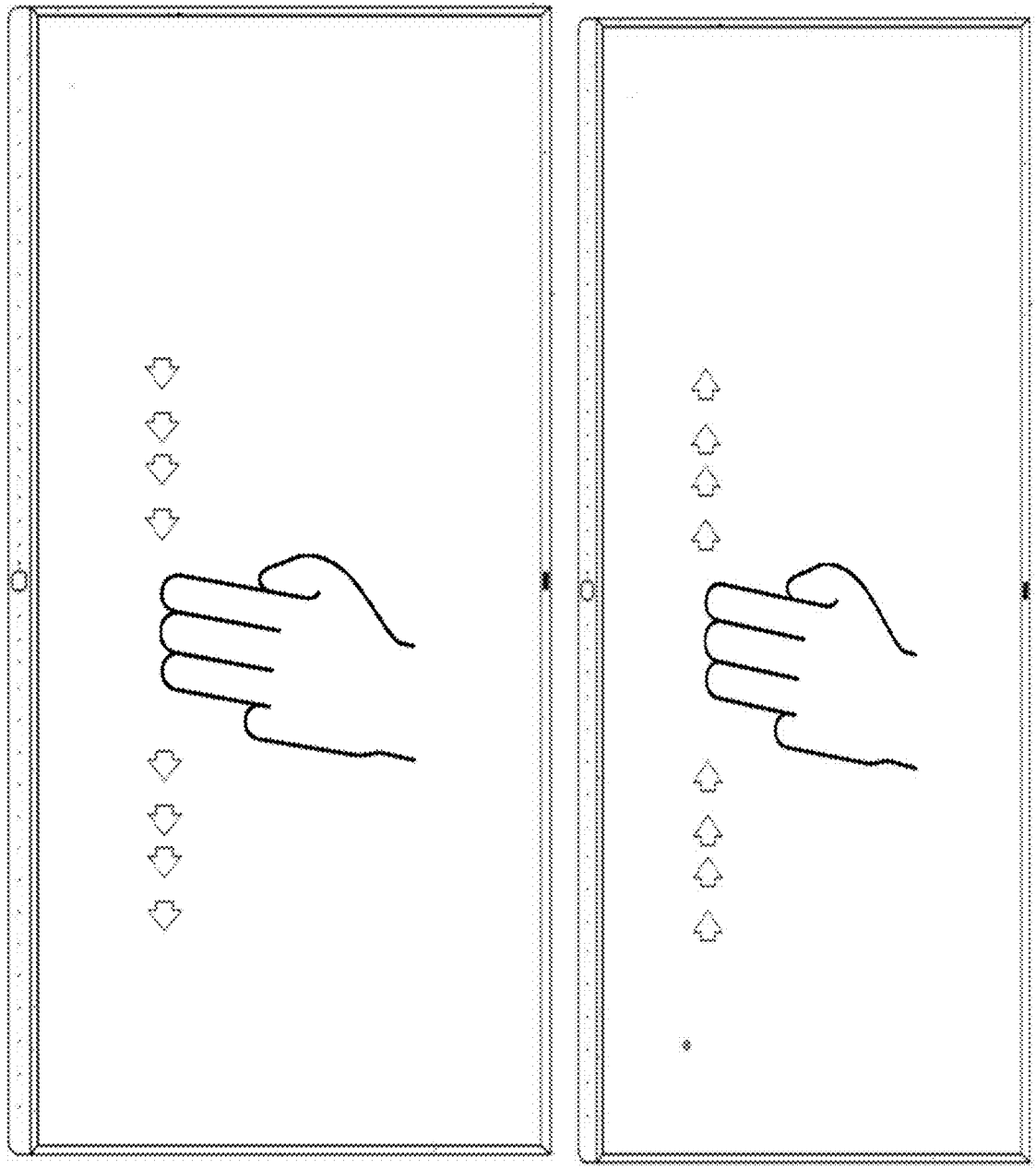
FIG. 5 shows substantially horizontal swipes in a left and right direction from a frontal perspective view of the device.

With the movement of the user's fingers confirmed and a swipe gesture recognized via a comparison to predetermined characteristics stored in memory at 310, the controller 208 enables a transition based on the current operating state of the teleconferencing application 104 at 312. For example, when a swipe gesture is recognized in teleconferencing application 104, such as when the system is serving a virtual huddle room, a virtual meeting room, or a zoom room, for example, a swipe in one direction (e.g., a swipe in a left-to-right substantially horizontal direction relative to the user as shown in FIG. 5) causes the teleconferencing application 104 to change its input mode by switching to another A/V input as shown in FIG. 4. A swipe in the opposite direction (e.g., a swipe in a right-to-left substantially horizontal direction relative to the user as shown in FIG. 5) materializes a menu, from which a user can select from a list of options that perform a desired action. When a swipe command is recognized while the device is serving an external input selection, a swipe in one direction (e.g., a swipe in a left-to-right substantially horizontal direction relative to the user) enables a teleconferencing environment to be served in some devices by serving and enabling access to a virtual huddle room, a virtual meeting room, or a zoom room, for example. A swipe in the opposite direction (e.g., a swipe in a right-to-left substantially horizontal direction relative to the user) materializes a menu providing a list of options, from which a user can select from to execute a desired action. When a swipe command is recognized while the device is serving a list of options via a menu, a swipe in one direction (e.g., a swipe in a left-to-right substantially horizontal direction relative to the user) enables a change in an input mode by switching A/V inputs, for example. A swipe in the opposite direction (e.g., a swipe in a right-to-left substantially horizontal direction relative to the user) enables the device to serve a teleconferencing environment in some devices by serving and enabling access to a virtual huddle room, a virtual meeting room, or a zoom room, for example.

Figure 6:
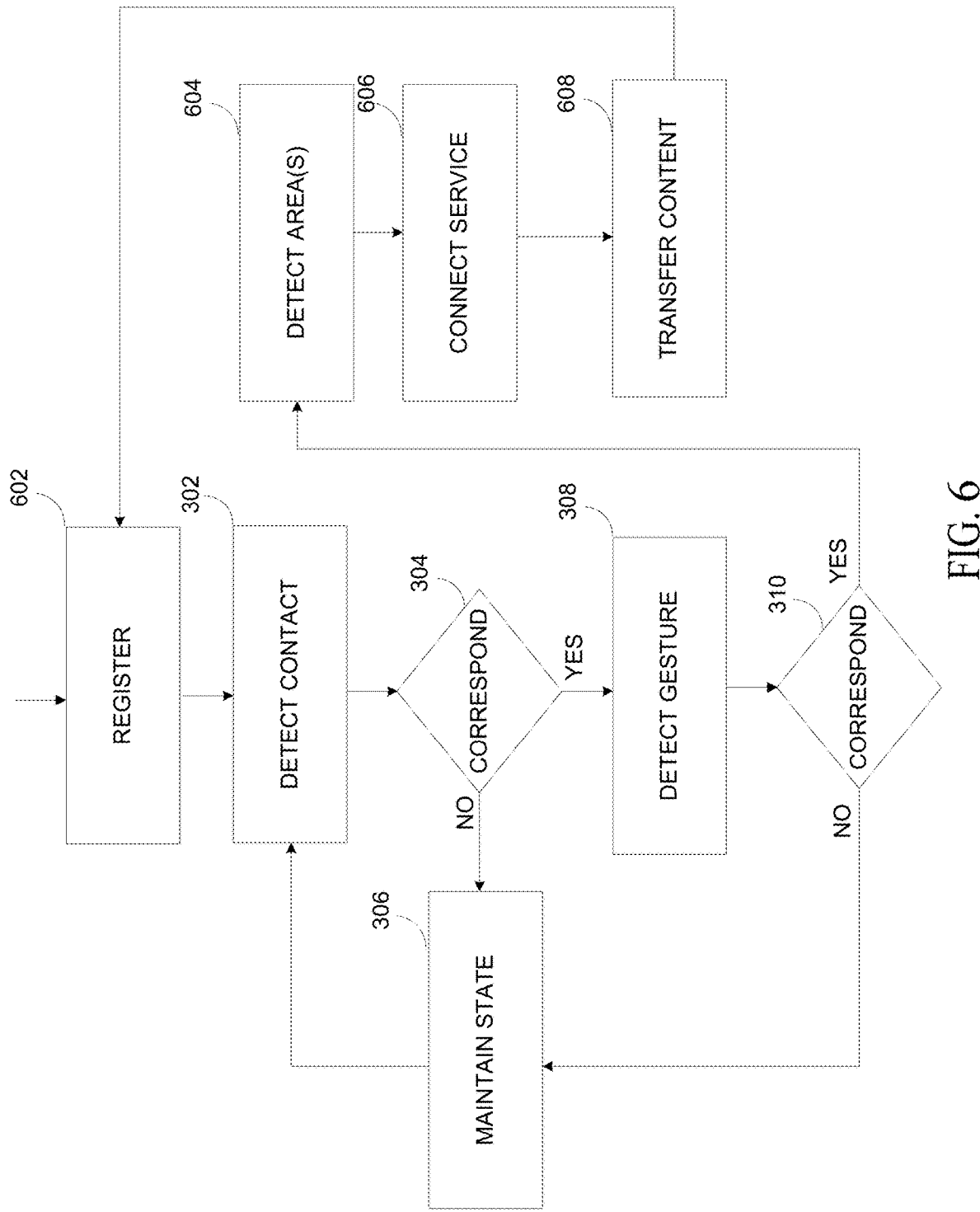
FIG. 6 is a process that transfers virtual objects without a physical pairing between a sending and a receiving device.

FIG. 6 is a process flow executed by systems that transfer objects (e.g., electronic files, documents, images, content, etc. referred to as objects or virtual objects) without an existing physical pairing between a sending and a receiving device through the transitional user interface in a substantially horizontal direction that is enabled, in a substantially vertical direction in alternative systems, or a combination in further alternative systems. The systems allow users to share objects where they want them through a system that reveals the transfer process by generating visual objects that represent the virtual objects. Their transfer results in a visual, tactile, and/or aural feedback at the sending and the receiving device in some applications when or as the objects are transferred. The systems and processes (referred to as systems) can duplicate and swipe content from one teleconferencing device to another by automatically detecting the physical and digital destinations that are where the objects will be sent. It includes a fading-in of virtual drop boxes that materialize on the sending and receiving devices on screen during the transfer process, in some systems, before an electronic transfer occurs. The process begins with the user swiping out a virtual object such as the representative document shown in FIG. 7.

Before a user swipes out the document, the sending and receiving teleconference devices register as service providers via the connecting networks at the teleconference system at 602. In FIG. 6, a touch-screen detects a user's input based on a physical contact at 302 or virtual contact via cameras in alternate systems. The touch-screen 202 detects contact and any movement or break in the contact on the touch-screen 202 when it occurs for a sufficient time and/or comprises a predetermined number of touches at 304. If contact is not recognized, the device does not change state and objects are not exchanged at 306.

In FIG. 6, gesture recognition begins when a predetermined amount of movement is detected. When multiple fingers are used, the gesture detector 204 uses the center point of the set of touches on the touch-screen 202 to measure the distance from the gestures originating location (e.g., the process save the original position of the physical/virtual touch in a memory) in the relative X and Y coordinate space. When the user's fingers lift from the touch-screen, the detection state ends, the final position is saved in that memory, and the distance and direction are generated at 308. Direction may be determined by calculating a difference between the original position and final position with the sign (e.g., positive or negative) of the difference indicating the direction and the largest coordinate difference indicating the type of swipe, whether it be a substantially vertical or a horizontal swipe.

With the movement of the user's fingers confirmed and a swipe recognized via a comparison to predetermined characteristics stored in memory at 310, the controller 208 fades in a virtual-drop box on the sending and receiving device screens. As shown, the sending device in some systems may materializes virtual-drop boxes connected to other devices such as Device 2 and Device N that are held or rendered as subviews until the swipe gesture hovers over their respective virtual drop boxes which thereafter increases their opacity when active at 604. With the virtual drop box materialized and the document linked to the swipe gesture (through a hover link), a swipe over the materialized virtual drop box (Device 1 shown in FIG. 7) causes the sending device to negotiate a data connection with the receiving device in the background, such as connection between the sending device and remote Device 1 shown in FIG. 7. The swipe-over further causes the object to be duplicated (e.g., the documents in FIG. 7) and the duplicate transferred to the receiving device with no additional device pairing. In alternate systems, virtual gestures are recognized through the cameras 206 disclosed herein and the systems and processes described in U.S. Provisional Application No. 62/900,232, titled Gesture Control Systems, that is herein incorporated by reference, and the disclosed functions are executed.

Figure 8:
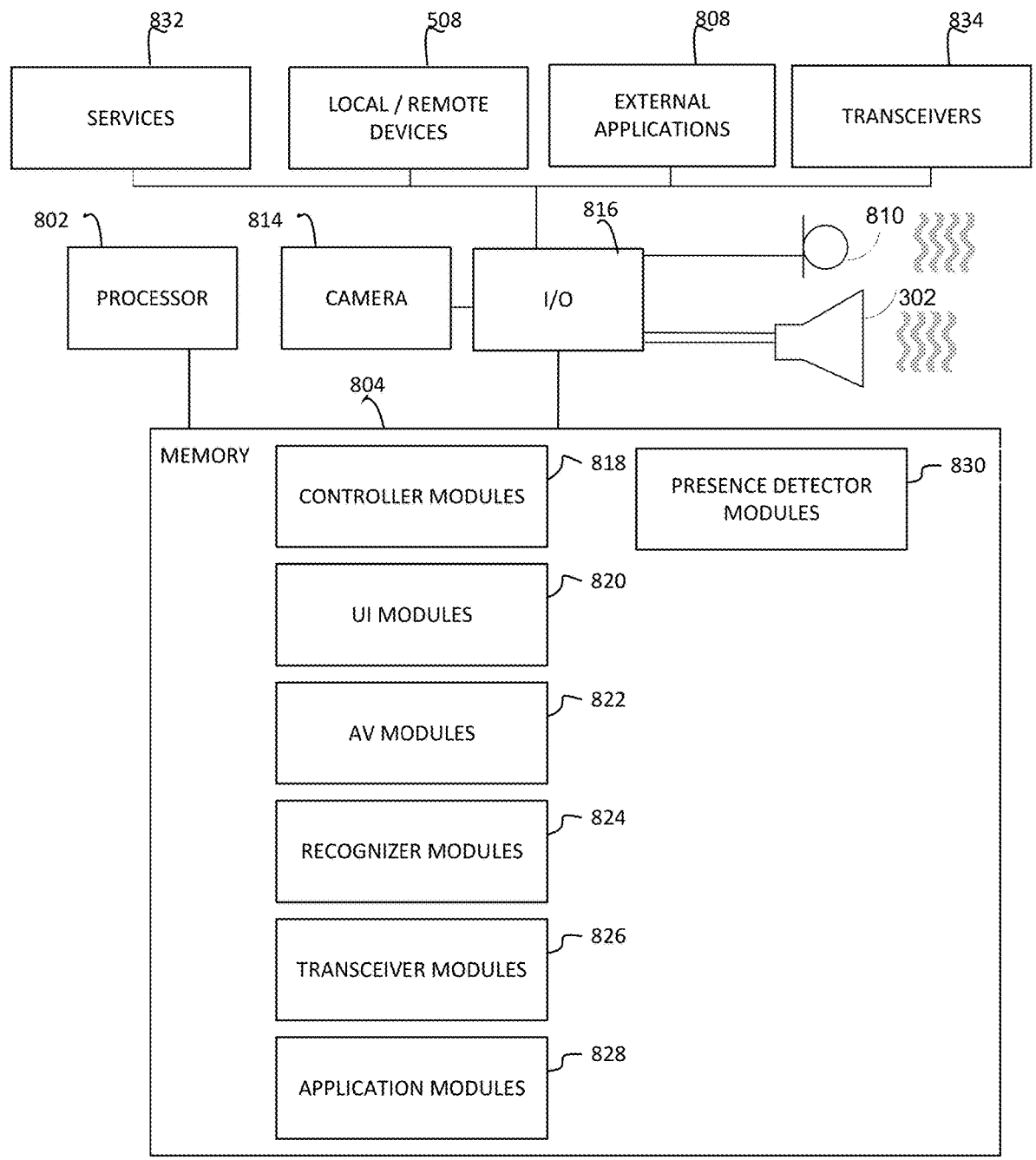
FIG. 8 is a third block diagram of an electronic teleconferencing system.

FIG. 8 is a block diagram of systems that may execute the process flows, functions, and systems described above and those shown in FIGS. 1-7. The system comprises a processor or graphical processor 802, a non-transitory media such as a memory 804 (the contents of which are accessible by one or more processors and/or graphical processors 802), a network, local/and remote devices 806, external applications 808, external services 832, a microphone or microphone array 224, one or more loudspeakers 220, audio amplifiers (not shown), audio interfaces (not shown), one or more cameras 206, transceivers 218 and an I/O subsystem 214. The I/O sub system 214 connects devices and local and/or replicated remote software applications. The memory 804 stores instructions, which when executed by the processor 802, causes the system to render some or all of the functionality associated with swipe gestures. The memory 804 stores instructions, which when executed by the processor 802, causes the system to automatically render functionality and hardware that enables swipe gesture recognitions and control through controller modules 818, transitional user interface modules 820, A/V input mode modules 822, gesture recognition modules 824 transceiver modules 826, teleconferencing system application modules 828 and presence detection modules 830. In yet another alternate system, the non-transitory media provided functionality is provided entirely or partially through cloud storage. The term cloud or cloud storage is intended to broadly encompass hardware and software that enables data to be maintained, managed, and backed up remotely and made available to users over a network. In this system, clouds and/or cloud storage provides ubiquitous access to the system's resources that can be rapidly provisioned over a private network. Clouds and/or cloud storage allows for the sharing of resources to achieve coherence services.

The memory 804 and/or storage disclosed may retain an ordered listing of executable instructions for implementing the functions described above in a non-transitory computer code. The machine-readable medium may selectively be, but not limited to, an electronic, a magnetic, an optical, an electromagnetic, an infrared, or a semiconductor medium. A non-exhaustive list of examples of a machine-readable medium includes: a portable magnetic or optical disk, a volatile memory, such as a Random-Access Memory (RAM), a Read-Only Memory (ROM), an Erasable Programmable Read-Only Memory (EPROM or Flash memory), or a database management system. The memory 804 may comprise a single device or multiple devices that may be disposed on one or more dedicated memory devices or disposed on a processor or other similar device. When functions, steps, etc. are said to be "responsive to" or occur "in response to" another function or step, etc., the functions or steps necessarily occur as a result of another function or step, etc. It is not sufficient that a function or act merely follow or occur subsequent to another. The term "substantially" or "about" encompasses a range that is largely, but not necessarily wholly, what is specified. It encompasses all but an insignificant amount, such as the values disclosed and/or a variance within a range of five to ten percent of the given value or range.

Alternate systems are not limited to the particular hardware and process described above or two a particular swipe type described (e.g., horizontal or vertical swipe). The systems illustratively disclosed herein suitably may be practiced in the absence of any element (including hardware and/or software), which is not specifically disclosed herein. They may operate in the absence of those elements. Further, the various elements described in each of the many systems described herein is regarded as divisible with regard to the individual elements described, rather than inseparable as a whole. In other words, alternate systems encompass any variation and combinations of elements described herein and may be made or used without the various elements described (e.g., they may operate in the absence of one or more of the disclosed elements).

The transitional user interfaces provide an intuitive stand-alone interaction node that controls system APIs for teleconferencing technology. The transitional user interface enables external automation to select A/V inputs through physical and digital detections conveyed via a touchless gesture and/or a physical contact touch gesture. The systems allow users to control A/V inputs and/or transfer content through a more natural process, that in some systems, provide optional visual, aural, and/or tactile confirmations at local and/or remote devices without requiring the user to step through the computational steps required to select an input mode or transfer or exchange content from one device (e.g., a local device) to one or more other devices (e.g., the remote device) in other systems. There is no need for formal processes that select devices, menus, objects, or inputs. The disclosed devices recognize each other automatically and enable a fluid intuitive user interaction.

To improve the selection of A/V inputs, menu selections, send objects (e.g., electronic documents, files, folders, icons, images, etc.) or commands in a virtual teleconference system, all that is required is the simulation of or dragging of two or more fingers across a touch sensitive or across a simulated virtual screen instead of walking through a regimented sequence that computer requires to allow the user to enable the desired functionality.

The disclosed systems and methods eliminate the user's need to learn the computational processes that are replaced by an intuitive transitional user interface and API that enables device-to-device communication. The systems expose a secure interface that makes external connections in the background in real time, materializes those connections through representations on the devices and translates user's touchless gestures and/or physical touch gestures from one device into protocol specific commands understood and executed by another device (such as a remote device) or proprietary commands to teleconferencing applications that enable a result such as the selection and switching of an A/V input, a selection of a menu option, and/or a transfer of content between one or more devices. In some systems, the interface translations are based on the current active state of the teleconferencing system operating during the user's session (e.g., detected by a processor), such as when the user is accessing a virtual huddle room, a virtual meeting room, a zoom room, an A/V input, or accessing a menu, for example.

The subject-matter of the disclosure may also relate, among others, to the following aspects (the aspects are referenced by numbers):

1. A computer implemented method of controlling a teleconferencing device, comprising:
   detecting a current operating state of the teleconferencing device;
   detecting a contact with a touch-screen device associated with a selection of an audio and a visual input, a selection of an option from a list of options that performs an action in the teleconferencing device, or a transferring of a virtual object between a plurality of devices that comprise the teleconferencing device;
   continuously sensing a gesture across the touch-screen device by identifying a first location of a first contact with the touch-screen, a distance of a continuous contact with the touch screen, and a final location of a last contact with the touch-screen;
   executing a command associated with the selection of an audio and a visual input, the selection of an option from a list of options that performs an action in the teleconferencing device, or the transferring of a virtual object between a plurality of devices in response to a current operating state of the teleconferencing device and a plurality of characteristics of the gesture.
2. The computer implemented method of aspect 1, where the touch screen comprises a virtual touch screen and the contact comprises a virtual contact.
3. The computer implemented method of any of aspects of 1 to 2, where the list of options is rendered via an electronic menu.
4. The computer implemented method of any of aspects of 1 to 3 where the final location of a last contact with the touch-screen renders a landing spot that is electronically associated with a second teleconferencing device.
5. The computer implemented method of any of aspects of 1 to 4 where the teleconferencing device actuates a menu selection, mode selection, and a menu selection in response to the gesture.
6. The computer implemented method of any of aspects of 1 to 5 where in the executing of the command results in a visual, a tactile, and an aural feedback.
7. The computer implemented method of any of aspects of 1 to 6 where the detecting a contact occurs in response to an automated presence detector.
8. The computer implemented method of any of aspects of 1 to 7 where the virtual object comprises an electronic document.
9. The computer implement method of any of aspects of 1 to 8 where the virtual object comprises an electronic file.
10. The computer implement method of any of aspects of 1 to 9 where the plurality of devices comprise a local device and a remote device.
11. A method of controlling a teleconferencing device, comprising:
   detecting a current operating state of the teleconferencing device;
   detecting a contact with a touch-screen device associated with a selection of an audio and a visual input, a selection of an option from a list of options that performs an action in the teleconferencing device, or a transferring of a virtual object between a plurality of devices that comprise the teleconferencing device;
   continuously sensing a gesture across the touch-screen device by identifying a first location of a first contact with the touch-screen, a distance of a continuous contact with the touch screen, and a final location of a last contact with the touch-screen;
   executing a command associated with the selection of an audio and a visual input, the selection of an option from a list of options that performs an action in the teleconferencing device, or the transferring of a virtual object between a plurality of devices in response to a current operating state of the teleconferencing device and a plurality of characteristics associated with the gesture.
12. The method of aspect 11, where the touch screen comprises a virtual touch screen and the contact comprises a virtual contact.
13. The method of any of aspects of 11 to 12, where the list of options is rendered via an electronic menu.
14. The method of any of aspects of 11 to 13 where the final location of a last contact with the touch-screen renders a landing spot that is electronically associated with a second teleconferencing device.
15. The method of any of aspects of 11 to 14 where the teleconferencing device actuates a menu selection, mode selection, and a menu selection in response to the gesture.
16. The method of any of aspects of 11 to 15 where in the executing of the command results in a visual, a tactile, and an aural feedback.
17. The method of any of aspects of 11 to 16 where the detecting a contact occurs in response to an automated presence detector.
18. The method of any of aspects of 11 to 17 where the virtual object comprises an electronic document.
19. The method of any of aspects of 11 to 18 where the virtual object comprises an electronic file.
20. A system for controlling a teleconferencing device, comprising:
   means for detecting a current operating state of the teleconferencing device;
   means for detecting a contact with a touch-screen device associated with a selection of an audio and a visual input, a selection of an option from a list of options that performs an action in the teleconferencing device, or a transferring of a virtual object between a plurality of devices that comprise the teleconferencing device;
   means for continuously sensing a gesture across the touch-screen device by identifying a first location of a first contact with the touch-screen, a distance of a continuous contact with the touch screen, and a final location of a last contact with the touch-screen;
   means for executing a command associated with the selection of an audio and a visual input, the selection of an option from a list of options that performs an action in the teleconferencing device, or the transferring of a virtual object between a plurality of devices in response to a current operating state of the teleconferencing device and a plurality of characteristics of the gesture.

Other systems, methods, features and advantages will be, or will become, apparent to one with skill in the art upon examination of the figures and detailed description. It is intended that all such additional systems, methods, features and advantages be included within this description, be within the scope of the disclosure, and be protected by the following claims.

What is claimed is:
1. A computer implemented method of controlling a teleconferencing device, comprising:
   detecting a current operating state of the teleconferencing device;

detecting a contact with a touch-screen device associated with a selection of an audio and a visual input, a selection of an option from a list of options that performs an action in the teleconferencing device, or a transferring of a virtual object between a plurality of remote devices that comprise the teleconferencing device;

continuously sensing a gesture across the touch-screen device by identifying a first location of a first contact with the touch-screen, a distance of a continuous contact with the touch screen, and a final location of a last contact with the touch-screen; and executing a command associated with the selection of an audio and a visual input, the selection of an option from a list of options that performs an action in the teleconferencing device, or the transferring of a virtual object between a plurality of devices in response to a current operating state of the teleconferencing device and a plurality of characteristics of the gesture;

where the first contact and the last contact comprise a first plurality of contacts and a last plurality of contacts, respectively, and the distance of the continuous contact comprise a measure of a length along a central axis that divides a first plurality of outer ends of the first plurality of contacts and a second plurality of outer ends of the last plurality of contacts into substantially equal areas.

2. The computer implemented method of claim 1, where the touch screen comprises a virtual touch screen and the contact comprises a virtual contact.

3. The computer implemented method of claim 1, where the list of options is rendered via an electronic menu.

4. Computer implemented method of claim 1 where the final location of a last contact with the touch-screen renders a landing spot that is electronically associated with a second teleconferencing device.

5. The computer implemented method of claim 1 where the teleconferencing device actuates a menu selection, mode selection, and a menu selection in response to the gesture.

6. The computer implemented method of claim 1 where in the executing of the command results in a visual, a tactile, and an aural feedback.

7. The computer implemented method of claim 1 where the detecting a contact occurs in response to an automated presence detector.

8. The computer implemented method of claim 1 where the virtual object comprises an electronic document.

9. The computer implement method of claim 1 where the virtual object comprises an electronic file.

10. The computer implement method of claim 1 where the plurality of devices comprise a local device and a remote device.

11. A method of controlling a teleconferencing device, comprising:

detecting a current operating state of the teleconferencing device;

detecting a touchless contact with a touch-screen device associated with a selection of an audio and a visual input, a selection of an option from a list of options that performs an action in the teleconferencing device, or a transferring of a virtual object between a plurality of distributed devices that comprise the teleconferencing device;

determining a central axis of the touchless contact with respect to the touch screen that establishes an equal distance area between outer ends of a contact area as if the contact is made across the touch screen;

continuously sensing a gesture with respect to the touch-screen device by identifying a first location of a first touchless contact with respect to the touch-screen along the central axis, a distance of a continuous touchless contact with respect to the touch screen along the central axis, and a final location of a last touchless contact with the touch-screen along the central axis; and executing a command associated with the selection of an audio and a visual input, the selection of an option from a list of options that performs an action in the teleconferencing device, or the transferring of a virtual object between a plurality of devices in response to a current operating state of the teleconferencing device and a plurality of characteristics associated with the gesture;

where the first touchless contact and the last touchless contact comprise a plurality of touchless contacts, respectively, and the distance of the continuous touchless contact comprises a measure of a length along the central axis that divide the plurality of touchless contacts that comprise the first touchless contact and the plurality of contacts the comprise the last touchless contact, respectively, into substantially equal areas.

12. The method of claim 11, where the touch screen comprises a virtual touch screen.

13. The method of claim 11, where the list of options is rendered via an electronic menu.

14. The method of claim 11 where the final location of a last touchless contact with the touch-screen renders a landing spot that is electronically associated with a second teleconferencing device.

15. The method of claim 11 where the teleconferencing device actuates a menu selection, mode selection, and a menu selection in response to the gesture.

16. The method of claim 11 where in the executing of the command results in a visual, a tactile, and an aural feedback.

17. The method of claim 11 where the detecting the touchless contact occurs in response to an automated presence detector.

18. The method of claim 11 where the virtual object comprises an electronic document.

19. The method of claim 11 where the virtual object comprises an electronic file.

20. A system for controlling a teleconferencing device, comprising:

means for detecting a current operating state of the teleconferencing device;

means for detecting a contact with a touch-screen device associated with a selection of an audio and a visual input, a selection of an option from a list of options that performs an action in the teleconferencing device, or a transferring of a virtual object between a plurality of devices that comprise the teleconferencing device;

means for detecting a central axis of the contact with the touch screen establishing an equal distance area between a contact area as the detected contact is detected across the touch screen;

means for continuously sensing a gesture across the touch-screen device by identifying a first location of a first contact with the touch-screen along the central axis, a distance of a continuous contact with the touch screen along the central axis, and a final location of a last contact with the touch-screen along the central axis; and means for executing a command associated with the selection of an audio and a visual input, the selection of an option from a list of options that performs an action in the teleconferencing device, or the transferring of a virtual object between a plurality of devices in response to a current operating state of the teleconferencing device and a plurality of characteristics of the gesture; where the first contact and the last contact comprise a plurality of contacts, respectively, and the means for continuously sensing a gesture comprises measuring a length along the central axis that divide the plurality of contacts that comprise the first contact and the plurality of contacts that comprise the last contact into substantially equal parts.

* * * * *